Sept. 26, 1933.    L. R. MORSHEAD ET AL    1,928,431
PROJECTION OF LIGHT
Filed April 11, 1931    2 Sheets-Sheet 1

Inventors
L. R. Morshead:
H. Martin:
by
W. E. Evans
Attorney

Patented Sept. 26, 1933

1,928,431

UNITED STATES PATENT OFFICE 1,928,431

PROJECTION OF LIGHT

Leslie Robert Morshead, London, and Harold Martin, East Molesey, England

Application April 11, 1931, Serial No. 529,444, and in Great Britain July 10, 1930

5 Claims. (Cl. 240—41.3)

The invention relates to light projectors more especially adapted for use in motor car and like head lamps.

The invention has among its objects to provide such a projector which will project a long throw beam of high and uniform intensity accompanied by a local beam of alternative characteristics, and further to provide a head light for motor and like vehicles in which a long throw beam which is free from dazzling effect is accompanied by a secondary beam giving local illumination and, if necessary, a third beam capable of being directed upwardly as a signal or like beam.

According to the invention a light projector is provided in which the projected beam, which converges towards a focal point or zone, is divided into a number of portions, one of which is then formed into a concentrated beam, the remaining portion or portions being deflected and utilized for local illumination, signalling or like purposes.

According to the invention, moreover, a headlight for vehicles may be provided in which the projected beam of light, which converges towards a focal point or zone, is divided into an upper portion which is then formed into a concentrated beam having a substantially flat upper boundary and a deflected lower beam producing widespread local illumination.

According to the invention, moreover, there may be provided a light projector producing a focussed beam of high intensity and a secondary beam of relatively low intensity and wide angle, consisting of an optical system comprising an ellipsoidal reflector, a source of light disposed at the focus of the said reflector, a wide angle refracting system within the said ellipsoidal reflector to refract the rays which do not fall on the said reflector, a frontal focussing lens and an optical system intercepting part of the rays from the ellipsoidal reflector and the refracting system and diverting it to form the secondary beam.

According to the invention, moreover, in such a headlight or other light projector there may be provided an obturator in the form of a reflecting surface inclined to and extending to or near to the axis of the projector and reflecting a portion of the cone of rays leaving the ellipsoidal reflector into a direction distinct from that followed by the beam projected by the ellipsoidal reflector.

According to the invention, moreover, a second reflecting surface may be provided to receive the rays so reflected and to reflect them in the desired direction distinct from the direction of the beam projected by the ellipsoidal reflector.

According to the invention, moreover, the obturator or reflecting surface may be adjusted transversely to the axis of the projector and may be pivotally mounted and provided with means whereby it may be moved into and out of the path of the rays which it is adapted to reflect.

According to the invention, moreover, the second reflecting surface may be inclined to the axis of the projector and pivotally mounted about an axis transverse to the axis of the projector.

The form of the aperture or sector serving to define the projected beam is determined according to the purpose to which the projector system is applied. Thus, where the projector system is applied to a head light for motor or like vehicles the aperture or sector is only required for the purpose of topping or flattening the upper boundary of the beam in order to avoid glare and for this purpose it is sufficient that a plate or other element of the required form should extend upwardly to the desired extent into the path of the beam as it leaves the optical unit of the projector system. It may, however, be advantageous to extend the sector to the axis of the projector system, thus cutting off the lower portion of the beam leaving the optical unit and permitting the lamp to be used with the axis horizontal, and in such a construction the light so cut off may be utilized with advantage for local illumination. Thus, in the case of the near side light, the sector may be provided in the form of an inclined reflector extending towards or to the axis of the projector system, and adapted to co-operate with a second reflector to throw the beam partially forward and partially in the downward direction. In the case of the offside lamp the sector may take the form of a reflector disposed at an inclination to and extending towards or to the axis of the projector system in such manner as to throw the portion of the beam cut off in the upward direction for use as a sky sign or signalling beam. Such forms of auxiliary reflecting surfaces may, however, be combined in such manner that part of the cut-off portion of the beam is projected downwardly and forwardly and part is projected upwardly.

The invention further comprises the features of construction which are hereinafter described.

The accompanying drawings illustrate the invention diagrammatically and by way of example.

Figure 1:
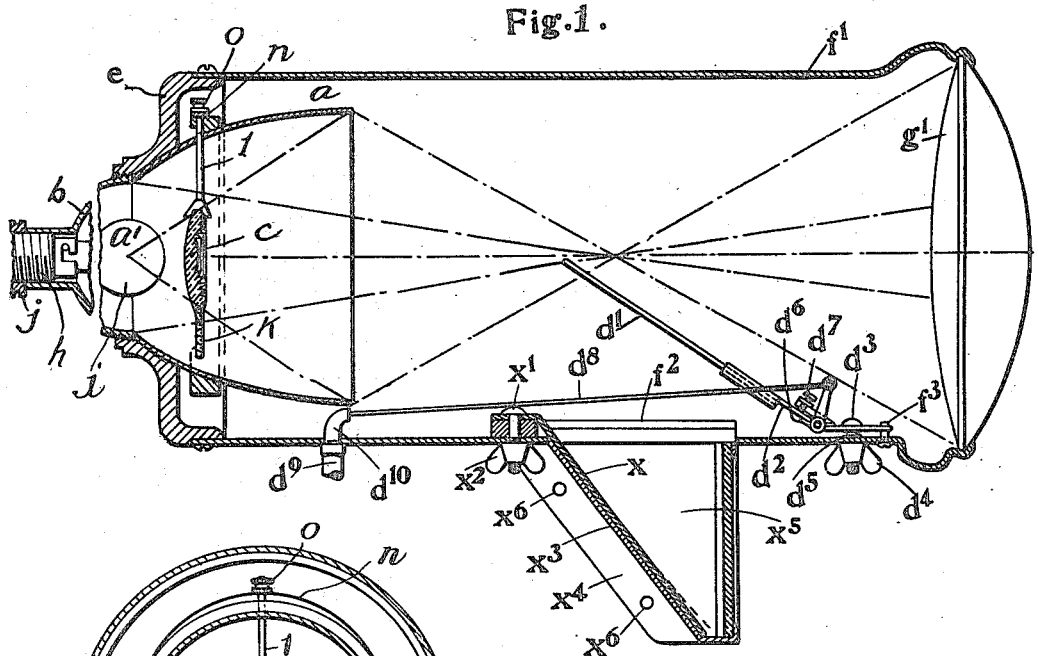
Figure 1 is a sectional elevation of a head-light for motor and other vehicles provided according to the invention.
Figure 2:
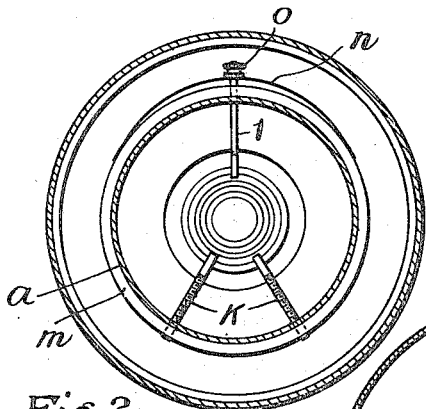
Figure 2 is a cross-sectional view of the headlight taken through the ellipsoidal reflector.
Figure 3:
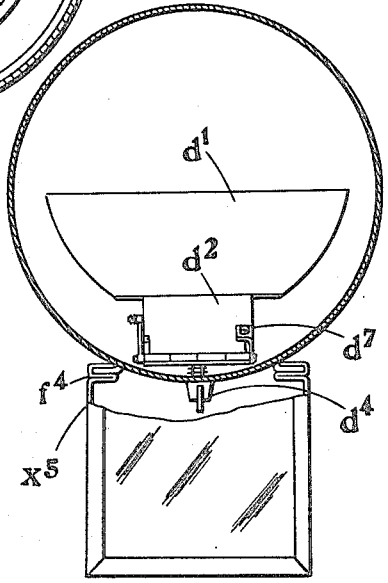
Figure 3 is a cross-section of the lamp shown in Figure 1.

Referring to the accompanying drawings, the ellipsoidal reflector $a$ is mounted in a supporting fitting $e$ of suitable shape forming the rear closure plate of the casing $f$, which casing is secured at the rear end to the fitting $e$ by such means as screws, the fitting $e$ being provided with a peripheral seating to receive the end of the casing. At the forward end the casing is flared at $f'$ and adapted to receive the frontal lens $g$, which, in the construction illustrated, is merely spun into the casing, but may be carried by any suitable form of mount adapted, for example, to permit of adjustment of position or to permit the substitution of other lenses of differing forms and dimensions to control the character and zone of the projected beam. At the rear the fitting $e$ is provided to receive the semi-spherical reflector $b$ which is itself formed to serve as a socket for the reception of a contact fitting and holder $h$ for the source of light, an incandescent electric lamp $i$, the contact fitting or holder $h$ being locked in position within the socket by means of a lock nut $j$. The engagement of the semi-spherical reflector $b$ with the fitting $e$ is conveniently effected by means of a screw joint, the fitting $e$ being provided with a shoulder which determines the forward limit of entry of the reflector $b$ and at the same time defines the focal plane of the reflector $a$. The adjustment of the contact fitting or holder $h$ in the reflector $b$ is effected in such manner as to bring the centre of the filament of the incandescent lamp $i$ into coincidence with the forward edge of the reflector. By such means the setting of the lamp $i$ at the focus of the reflector system is readily and easily effected. It will be understood, moreover, that the centre of curvature of the semi-spherical reflector $b$ will lie upon the plane of the forward edge so as to ensure also that rays from the lamp which fall upon the reflector are reflected back through the focus of the projector system.

The step lens $c$ is conveniently supported by three radially disposed pins $k$ and $l$ which are adapted to engage through holes in the reflector $a$ in a surrounding collar $m$ surrounding the reflector. Each of the said pins is provided at the inner edge with a fork of suitable shape to form a seating for the lens $c$. The pins $k$ are screw-threaded to engage correspondingly screw-threaded holes in the collar $m$ and to be adjusted into determined or fixed positions, while the pin $l$ which is screw-threaded at the outer extremity is fitted to slide through a hole in the collar $m$ and is maintained with resilient pressure in engagement with the lens $c$ by means of a bow spring $n$ mounted upon the collar $m$ with a pin and slot connection and engaging by means of a hole over a shoulder of the pin $l$, so that it tends always to press the pin $l$ radially inwards against the lens $c$. Disengagement of these parts is prevented by means of a nut $o$ screwing upon the end of the pin $l$. The sector plate $d^1$ is suitably mounted within the casing $f$ and is advantageously so formed that it cuts off the lower sector of the converging beam from the optical unit $a$, $b$, $c$, and thus by co-operation with the lens $g$, which is focally related to it, determines or defines the upper boundary of the beam projected by the lamp. Moreover, in the use of the lamp having the upper boundary of the beam defined in the manner indicated, by adjustment of the angle of the lamp upon its mounting, it is possible to provide that the upper boundary or limit of the beam shall lie horizontal or at such an angle to the horizontal that it lies below eye level within a distance from the lamp at which glare would be pronounced, and only rises beyond eye level at a distance at which glare is not intense. In order to permit, if necessary, of adjustments of inclination or tilt of the lamp, it is advantageous that the lamp should be mounted in trunnion bearings provided in diametrical positions upon the casing $f$ and adapted to be engaged within a forked fitting of usual form suitably supported upon the vehicle.

The sector plate $d^1$ is provided in the form of a reflector which extends to the axis of the projector system so as to cut off the whole of the lower part of the beam from the optical unit and is set at such an angle as to reflect the beam downwardly and through an aperture $f^2$ in the casing on to a second reflector $x$ so disposed as again to reflect the rays partly in the horizontal direction and partly on to the ground surface. Thus, assuming, for example, that the angle of the beam projected by the optical unit is 60°, the reflector $d^1$ is, for example, adjusted to an angle of 37½° to the axis of the lamp and the reflector $x$ to an angle of 52½° to a line parallel to the same axis. With such a disposition of the reflectors the lowermost rays from the optical unit after the double reflection are projected horizontally, while the rays at and adjacent to the axis of the unit are reflected to the ground surface in a downward direction at an angle of about 30° to the horizontal. If it is desired that the local illumination of the ground should be advanced the lower portion of the reflector $x$ may be given a slight upward inclination or curvature so that the axial rays from the optical unit are reflected downwardly at a reduced angle, such as 20° to the horizontal. The manner in which the reflectors $d^1$ and $x$ are mounted is, of course, immaterial to their operation, but in the construction illustrated the reflector $d^1$ is carried by a suitable bracket $d^2$ mounted in position within the casing $f^1$ by means of a screwed pin $d^3$ which passes through a suitable seating within the casing for the reception at the exterior of a wing nut $d^4$. A spring washer or helical spring $d^5$ is interposed between the bracket $d^2$ and the seating in the casing so that by adjustment of the nut $d^4$ the vertical elevation of the reflector $d^1$ may be adjusted. To avoid rotational movement of the reflector, the bracket $d^2$ is conveniently engaged with a stop pin $f^3$ secured to the casing and engaging a hole or slot in the bracket $d^2$. The reflector $x$ may similarly be secured in position upon a seating in the casing $f^1$ by means of a screwed pin $x^1$ adapted for the reception outside the casing of a wing nut $x^2$ bearing upon a washer or boss provided upon the casing. This arrangement of mounting will permit of small angular adjustments of the reflector about the vertical axis, primarily to intensify near side or "kerb" illumination. To protect the reflector $x$ and the aperture $f^2$ from dust, a convenient hood or casing is provided. As illustrated this comprises a fixed rear plate $x^3$ with flanges $x^4$ riveted or otherwise secured to the casing $f^1$ behind the reflector $x$. Portions of metal along the lateral edges of the opening $f^2$ of the casing are rolled outwardly to form slides $f^4$ for the reception of a hood $x^5$ having a frosted or clear glass front plate and provided at the upper lateral edges to engage the slides $f^4$ so that it may be positioned with the rearward edges of the lateral walls coinciding with the rear edges of the flanges $x^4$ of the plate $x^3$. The hood may thus be secured in position by such means as screws or other fastenings engaging the said lateral walls and the flanges $x^4$ as at $x^6$.

Figure 4:
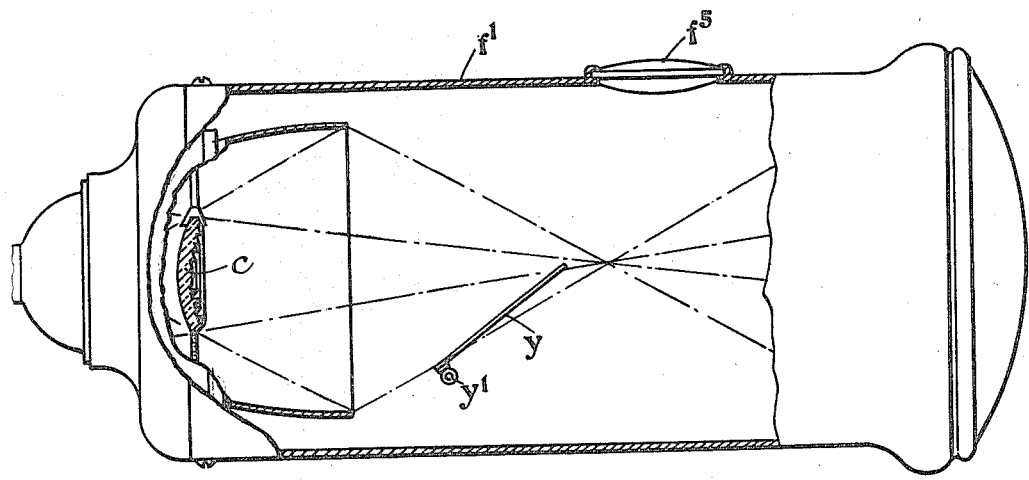
Figure 4 is a part elevation partly in section of a lamp such as is shown in Figure 1 provided with a different form of sector or cut-off plate.
Figure 5:
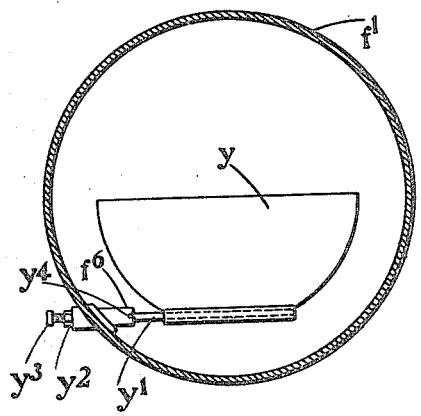
Figure 5 is a cross-section corresponding to Figure 4.

The construction of lamp which is described is convenient for use as a near side head lamp. For the offside head light, however, it is not so essential to provide local ground illumination, and in this case the sector or cut-off plate may, as indicated in Figures 4 and 5, take the form of a reflector $y$ extending to the axis of the projector system and disposed at an angle such as to permit the cut-off portion of the beam from the optical unit to be projected upwardly through a lens or aperture in the casing at $f^5$. The reflector $y$ may be mounted in any convenient manner. Thus, as illustrated, it is carried by a transverse spindle $y^1$ which passes outwardly through a boss $f^6$ fitted to the casing $f^1$ and is provided at the outer end with a screw-threaded portion for the reception of a holding nut $y^2$. The spindle may further be provided with a knob $y^3$ by which it may be manipulated and in order that the reflector may be set in a determined position with facility the spindle may be provided with a transverse pin $y^4$ which engages in a transverse groove or slot in the inner face of the boss $f^6$ when the reflector is in position.

By such means the cut-off rays of light are utilized as a signalling beam as a safeguard in the negotiation of corners and similar situations.

Where it is desired to permit the full beam from the optical unit to be used occasionally as, for example, for inspecting sign posts, it is advantageous that the cut off reflector system should be adapted to be lowered from its position out of the path of the beam. For this purpose the bracket $d^2$ may as illustrated, be provided in two parts which are hinged together and mounted under the action of a helical spring $d^6$ about the pivot pin tending to move the reflector upwardly into contact with a stop formed, for example, by a screw-threaded stop pin $d^7$ carried by an upstanding arm or lug provided upon the lower or supporting portion of the bracket $d^2$. The bracket $d^2$ is attached by means of a crank arm to the inner member of a Bowden mechanism $d^8$, the outer member $d^9$ of which is connected to the casing $f^1$ at a convenient position to permit the inner member to be introduced therein through a suitable guide $d^{10}$. Thus, by the operation of the Bowden mechanism from the driver's seat the reflector $d^1$ may at will be moved from the operative position.

The frontal focusing lens, whatever its construction, serves an important purpose in that it intensifies the beam which is projected through it and affords distance illumination of high central intensity accompanied by outer illumination of sufficient intensity to serve practical requirements, the intensity of the focussed beam being controlled by the lens aperture and focal length.

It further minimizes or avoids the projection of images from the optical unit and the light source.

By the use of a sector or cut-off plate with the optical system in the manner hereinbefore described no reduction of intensity of the focussed beam is involved.

The use of lenses of simple or prismatic formation in conjunction with or in substitution of the auxiliary reflectors dealing with the cut-off portion of the beam is also possible, to obtain particular effects in the dispersion or distribution of the diverted beam.

We claim:

1. A light projector comprising a tubular casing, a closure plate at one end, a focussing lens at the other end, an ellipsoidal reflector carried by the said closure plate, a semi-spherical reflector carried by the said closure plate to the rear of the ellipsoidal reflector, a source of light mounted in said semi-spherical reflector in coincidence with the centre of the said reflector and the focus of the ellipsoidal reflector, a step lens supported within said ellipsoidal reflector to receive and refract the cone or rays of light from the source of light which do not fall upon the reflectors, a sector diaphragm between said ellipsoidal reflector and said frontal lens, the said diaphragm extending into the converging beam projected by the reflector system and the step lens and diverting a portion of said beam in an outward direction, and an aperture in the casing through which the said diverted portion of the beam passes.

2. A light projector, comprising an optical unit to produce a converging beam and consisting of an ellipsoidal frontal reflector, a source of light at the focus of the reflector, a wide angle lens within the said reflector to refract towards the conjugate focus of the ellipsoidal reflector the cone of rays of light from the source of light which do not impinge upon the reflector, a reflector extending at an angle towards the axis of the projector and reflecting a portion of the cone of rays of light leaving the ellipsoidal reflector in a downward direction, a second reflector inclined to the axis of the projector to receive the rays so reflected and to reflect them forwardly and away from the axis of the projector, and a frontal focussing lens forward of the said reflectors to concentrate the unobstructed portion of the cone of rays leaving the ellipsoidal reflector into a beam of high intensity.

3. A light projectors, as set forth in claim 2, in which the reflector reflecting the lower portion of the cone of rays of light leaving the ellipsoidal reflector is pivotally mounted and means are provided for moving the said reflector relatively to the path of the said lower portion of the cone of rays of light.

4. A light projector, as set forth in claim 2, in which the reflector inclined to and extending towards the axis of the projector is adjustable transversely to the axis of the projector, substantially as hereinbefore described.

5. A light projector, as set forth in claim 2, wherein the second reflector inclined to the axis of the projector is pivotally mounted about an axis transverse to the axis of the projector, substantially as hereinbefore described.

LESLIE ROBERT MORSHEAD.
HAROLD MARTIN.